United States Patent [19]

Rohling

[11] 3,856,205
[45] Dec. 24, 1974

[54] PLANT WATERING DEVICE

[76] Inventor: Hermann Rohling, 4160 Pearl Rd., Cleveland, Ohio 44109

[22] Filed: July 18, 1972

[21] Appl. No.: 272,847

[52] U.S. Cl. .................. 239/63, 239/276, 47/38, 47/48.5
[51] Int. Cl. .................. A01g 25/00, B05b 1/30
[58] Field of Search .................. 239/63–65, 239/276, 1; 47/38, 48.5, 1

[56] References Cited
UNITED STATES PATENTS

| | | | |
|---|---|---|---|
| 3,125,255 | 3/1964 | Kaiser | 239/63 X |
| 3,438,575 | 4/1969 | Rohling | 239/63 X |

FOREIGN PATENTS OR APPLICATIONS

| | | | |
|---|---|---|---|
| 1,207,697 | 12/1965 | Germany | 239/63 |
| 1,473,290 | 2/1967 | France | 47/38 |

*Primary Examiner*—Robert S. Ward, Jr.
*Attorney, Agent, or Firm*—Fay & Sharpe

[57] ABSTRACT

An automatic plant watering device includes a container having an upwardly opening fill passage and a downwardly opening discharge passage, said container being supported on a hollow beam projecting upward from soil alongside the plant to be watered. The fill passage extends downward into the container and then turns upwardly in a substantially U-shaped pattern to a discharge end within the water storage portion of the container. Thus, water entering the container flows down and then up and over the inner terminus of the fill passage for storage and later use. The discharge passage comprises a duct which extends upward from near the bottom of the container and then downward in an inverted U-shaped pattern to terminate at an opening in the side of a standpipe. The standpipe projects from within the container downwardly through its bottom and upwardly to a point at least as high as the upper terminus of the inwardly opening fill passage, but below the top of the container. A tube extends from inside the support beam into the container and terminates near the top of the container, above the discharge end of the fill passage.

10 Claims, 4 Drawing Figures

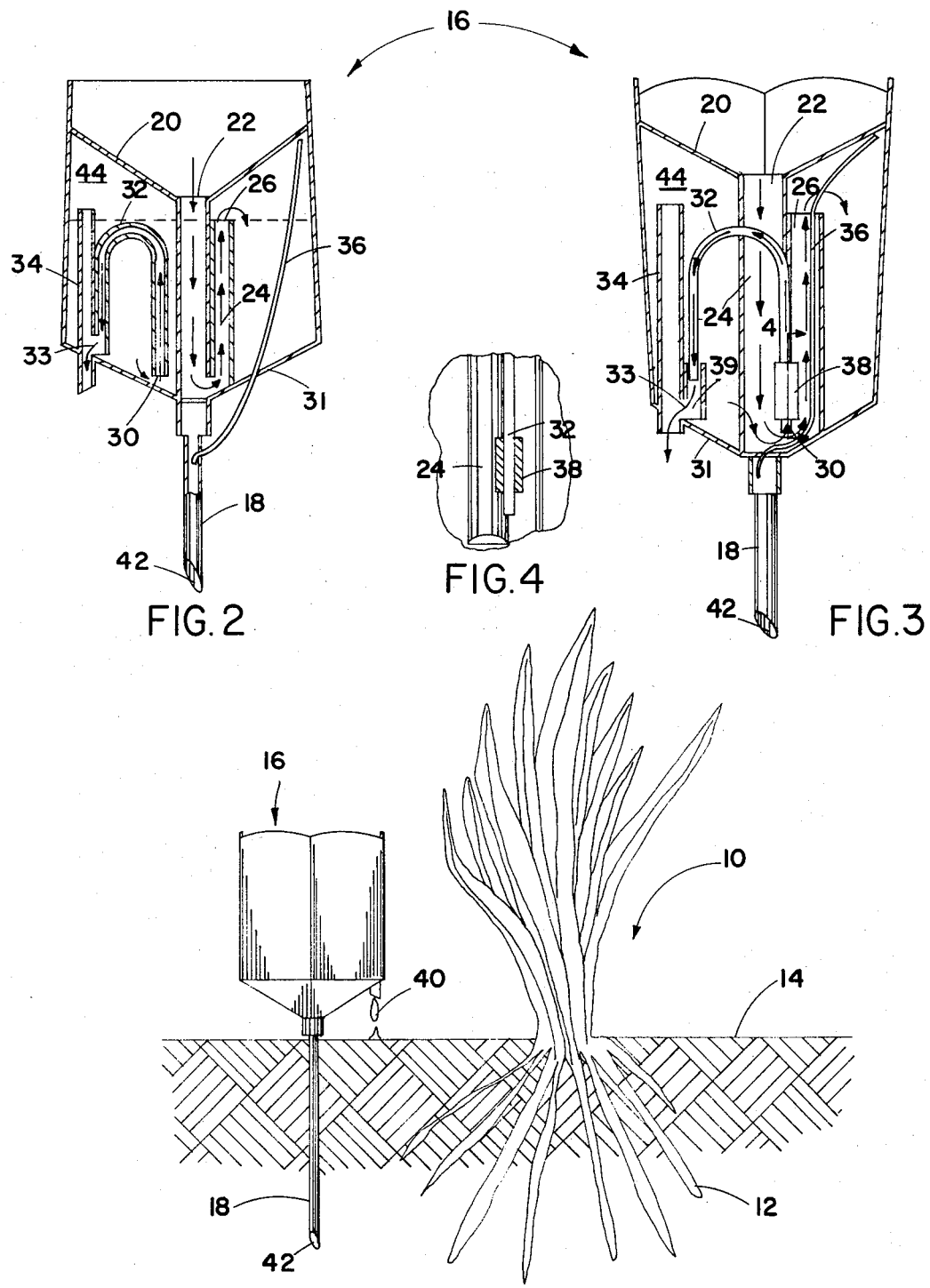
PATENTED DEC 24 1974
3,856,205

PLANT WATERING DEVICE

BACKGROUND OF THE INVENTION

Proper watering of plants, particularly potted plants and those in window boxes, is a continuing problem for apartment dwellers and all flower lovers. Not even an expert can look at the top surface of the soil and know with certainty whether the under surface is properly moist to supply water to the plant. The roots themselves may extend deep or they may be shallow, they will migrate toward the most moist soil in search of water. In addition to the everyday watering of plants, there is a need which has become more acute with the existing, more mobile population. For example, when the residents are on vacation, the inconvenience of having a neighbor or friend visit the home or apartment periodically to water plants is obvious. Certainly such individuals are not likely to be as vigilant as the owner.

There is clearly a need for some device which will feed water to the potted plants automatically, both when they need it and in proper amounts. Various devices for solving this problem have been suggested, including those disclosed in German Pat. No. 1,207,697 and the inventor's own U.S. Pat. No. 3,438,575. The disclosures of these two patents are specifically incorporated into this disclosure as showing the prior art for which this is an improvement.

While the need in the art is for a small device which is capable of automatically watering the plants as the need arises and without outside controls, it is most desirable to provide such a device having no moving parts. The instant invention satisfies all these needs.

BRIEF DESCRIPTION OF THE INVENTION

The device includes a container mounted above a sharpened hollow beam or shaft which extends into the soil adjacent the plant to be watered; the container is supported above the shaft to hold water which will be dispensed to the plant as the need arises.

The top of the container comprises a funnel-shaped upper surface which converges to the mouth of an inlet passage which extends downward to near the bottom of the container and then upward in a U-shaped pattern to have its discharge end adjacent the top surface of said container. Except for the indicated openings and apertures the top, sidewalls and bottom of said container are imperforate for reasons which will be explained subsequently. Water will flow into the mouth of the fill passage, down through the same and subsequently up and out through its inner terminus to fill a storage chamber.

An outlet passage extends from near the bottom, upwardly and then downwardly again in an inverted U-shaped pattern, with the downstream end being connected to the side of a hollow standpipe. The standpipe projects upwardly from below the bottom of the container, through the bottom and into the container to an elevation near its top.

There is one other conduit for fluid flow into and out of the container. It is a hollow tube which extends from within the storage chamber near its upper surface, downwardly through its bottom. Either the lower end of the tube itself or some other fluid flow passage to which it is connected is placed in the soil with an open end adjacent the roots of the plant to be watered.

Initially, the flower pot will have been filled with water to a level above the lower end of the lower tube adjacent the roots. Next, the container will be filled with water to approximately the level of the upper terminus of the standpipe. The fact of the level of the flower pot water being above the lower end of the tube blocks any flow through said tube. Thus, with the filled container, a little water will flow through the outlet passage into the standpipe and onto the upper surface of the soil in the flower pot. As this water is discharged into the lower portion of the standpipe, a void is created within the container and a vacuum formed in its upper portion. Consequently, whatever water is in the standpipe will be drawn upward by the vacuum to a point above the standpipe-discharge passage connection. This combination of water in the standpipe and vacuum from above serves to maintain the vacuum by blocking air flow through the standpipe which would relieve the vacuum; thus an equilibrium is achieved.

The equilibrium will be reached during the course of the dropwise discharge of water until the downward pull of the water by gravity is exactly balanced by the upward pull of the vacuum and at that point, no further water will be discharged through the discharge passage.

Over a period of time, water will evaporate from the soil and be absorbed by the roots of the plant. This will lower the water level in the pot until it is below the open tube which will allow air to flow through the soil and into the tube and subsequently into the container, thereby relieving the vacuum. With the vacuum relieved, more water will flow out of the discharge passage, until a subsequent equilibrium is reached.

BRIEF DESCRIPTION OF THE DRAWING

FIG. 1 is a fragmentary elevational view, partially in section, showing the watering device of this invention in close proximity to the plant within a window box or flower pot, FIG. 2 is a sectional view of the watering device of FIG. 1, FIG. 3 is a sectional view of a modification of the watering device of FIG. 2 and FIG. 4 is a fragmentary sectional view taken along line 4—4 of FIG. 3.

PREFERRED EMBODIMENTS

Referring particularly to FIG. 1, a plant 10 has roots 12 extending into soil 14 in a flower pot or flower box. Actually, the plant could be any place, including the lawn, but this invention is particularly adapted for use in flower boxes and flower pots. An automatic watering device 16 projects above the soil and automatically dispenses water to the plant in response to a lowered water level within the pot. The watering device 16 includes a container or storage chamber supported on a hollow support rod or beam 18 which is pushed into the soil 14 adjacent the roots 12. As will be explained subsequently, the hollow beam 18 is incorporated with a tube which extends upwardly inside the container to periodically relieve a vacuum therein and allow water to flow out of the container through a downwardly opening standpipe.

The container is illustrated in FIG. 2 and includes a frusto-conical upper surface 20 which acts somewhat as a funnel to direct water to the upwardly opening mouth 22 of an inlet or fill passage 24. The passage first extends downwardly to near the bottom of the container and then upwardly again in a U-shaped pattern to discharge the water at its exit or discharge end 26. Water will overflow the discharge end 26 of the fill passage to fill the container as it is fed through the mouth 22. Preferably the container is of clear plastic to allow one to see the water level at all times but it could be made of opaque material if desired. It is obvious that some of the upturned portion of the inlet passage 24 could be eliminated if desired. The only requirement is for some sort of water block to prevent in-flow of air; this may be accomplished by the traditional plumbing "goose-neck" as illustrated or by having the discharge end of passage 24 at the very bottom of the storage chamber. The vacuum will draw down the level of water in the fill passage and the length of the passage 24 must be such that air cannot leak in from this source.

A discharge passage 28 for conducting water out of the container collects water at its mouth 30 from near the bottom 31 of the container and conducts it upwardly and then downwardly in an inverted U-shaped passage 32 to its exit 33 which opens into a standpipe 34. Siphoning action by the inverted U-shaped passage 32 plays an important part in the proper functioning of the watering device, as will be subsequently explained. The standpipe 34 extends from below the bottom 31 upwardly into the container to an elevation near its top 20.

A hollow tube 36 extends upwardly within the container to near its top 20 and downwardly through the bottom 31 into the hollow of the shaft 18. The joined hollow conduits serve to conduct air from within the soil to the interior of the container in a manner to be explained. However, it should be stated that the upper end of tube 36 must be above the water level at all times, otherwise it will conduct water out of the container in an undesirable fashion.

Because of the need for proper orientation of the tubes and ducts at all times, it is preferred that the inlet passage 24, standpipe 34, discharge passage 28, and tube 36 all be relatively rigid, although they may be flexible to some extent.

FIG. 2 illustrates the tube 36 projecting into the hollow shaft 18 after passing through a separate opening in the bottom 31 of the container and this is certainly acceptable design. However, it will be observed in FIG. 3 that the tube 36 is slightly differently oriented than in FIG. 2, in that, it projects directly into the upper end of the hollow shaft 18. The design is clearly optional and each will function as described. Further, it will be obvious that the tube 36 may terminate immediately within the shaft 18 or extend down to its bottom without any change in its function. The tube could function adequately without the shaft but the extra work to properly locate its lower end in the soil makes the illustrated embodiments preferable.

FIG. 3 shows the entrance end of the discharge duct 28 held in place by a bracket 38 and the discharge end of the duct feeding into a small chamber 39 prior to the entrance of the water into the standpipe 34. These modifications are useful in certain circumstances when the pot or window box may be subject to jars or vibrations which might disorient loose flexible tubes.

In operation, the plant is watered and the shaft 18 shoved into the ground. Water is poured into the sloping, funnel shaped upper surface 20 of the container and it flows downwardly into passage 24 through the mouth 22 and subsequently out through exit 26 to fill the container. Air within the container will be displaced and flow out through standpipe 34. As previously stated, it is preferred that the device be constructed of clear plastic so one can clearly see the level of water in the device and cease pouring when the level reaches the top of the standpipe. However, the device cannot be overfilled as it will begin to discharge through the outlet passage 28 and overflow the top of the standpipe 34 when the water reaches that level. At that time, the gardener will observe drops of water 40 coming from the standpipe which signals that the container is full.

When filling stops, water will continue to flow through passage 28 for an instant, such flow will leave a void within the container and thereby create a vacuum. The vacuum will tend to suck water upward from outlet 33 into the standpipe, thereby blocking flow through the standpipe and preventing vacuum relief. Thus, no further water will flow from the container until the vacuum is relieved by other means.

After a certain period of time, water around the roots of the plant will evaporate or be absorbed by the roots. This will remove the water from around the opening at the bottom 42 of the hollow shaft 18, which opening will allow air to permeate the soil and flow upward through the shaft, thence to the duct 36 and into the upper portion 44 of the container where it will relieve the vacuum. With the relief of the vacuum in area 44, gravity will again draw water through the outlet duct 28 and out through the standpipe 34, with the attendant lowering of the upper surface of the water. This will again create a vacuum within the container which can only be relieved by the passage of more air up through the shaft 18 and the duct 36.

At such time as the water level in the flower pot again rises above the bottom 42 of the shaft 18, air can no longer flow and the vacuum will hold the remaining water in the container.

Air cannot flow upward through the standpipe to relieve because it is particularly constructed of a size whereby the combination of the vacuum in the upper surface of the container and the surface tension of the water draws a drop or two of the liquid upward into the standpipe above the discharge outlet 33, such that the few drops of water held there will block the passage of air into the upper section 44 of the container.

At such time as further water evaporates or is absorbed by the roots, the lower end 42 of the shaft will again be uncovered and the process repeated.

It will be appreciated that when the container is initially filled, it will cause the complete filling of the discharge tube 28 because the upper level of the standpipe 34 is above the uppermost extent of the discharge passage. Subsequently the tube will remain full because of the siphoning of the discharging liquid in the downstream section of the duct, even though the upper portion of the duct 28, itself, may extend above the water level. This siphoning affect allows substantially all the water stored in the container to be withdrawn as needed.

It also will be appreciated that at some time it may be necessary to refill the container while it is still stuck in the soil. Under those conditions, when water is poured into the container, it will force water out through the outlet duct 28 because the vacuum will be relieved by the inflow of water. However, because of the particular sizes of the outlet duct and the standpipe 34, air will be displaced and flow out of the standpipe faster than water will flow out of the outlet duct 28 and as a result, the container can be refilled without removing it from the soil, even though there will be some inherent water overflow at the time of the refilling.

I claim:

1. A plant watering device comprising,
a container having an upwardly opening fill passage for receiving water,
said passage extending through the otherwise imperforate top of said container and including structural means for preventing air flow into the container through said passage subsequent to filling said container with water,
said container including sidewalls extending from said wall to a bottom,
said container being supported such that it is above the lowest extent of the roots of the plant it is to water;
a standpipe projecting from below through the bottom of the container and extending upward within said container, said standpipe being hollow and defining a fluid passage from one end to the other;
a tube for placing in fluid communication with a point in the soil near the lowest extent of the roots and extending into the container and terminating above the upper level of the standpipe;
a discharge passage having its inlet near the bottom of the container,
said discharge passage extending upward and then downward to connect in fluid communication with the lower part of said standpipe.

2. The device of claim 1 including a hollow support beam connected to said bottom,
a portion of said tube extending into the hollow of said support beam.

3. The device of claim 2 including a top having a sloping surface converging downwardly toward said upwardly facing opening of the fill passage.

4. The device of claim 1 including a top having a sloping surface converging downwardly toward said upwardly facing opening of the fill passage.

5. The device of claim 1 wherein the container, tube, standpipe and the fill and discharge passages are of clear material to allow the user to see the fluid levels and flow during the watering operation.

6. The device of claim 1 wherein the structure defining the fill and discharge passages includes means for maintaining the inlets and outlets in substantially fixed position.

7. The device of claim 6 wherein the tube extends through a hole in the bottom of the container,
said hole being coaxial with the hollow of the support beam.

8. The device of claim 1 wherein the tube extends through a hole in the bottom of the container,
said hole being coaxial with the hollow of the support beam.

9. The device of claim 2 wherein the tube extends through a hole in the bottom of the container,
said hole being coaxial with the hollow of the support beam.

10. The device of claim 3 wherein the tube extends through a hole in the bottom of the container,
said hole being coaxial with the hollow of the support beam.

* * * * *